(12) United States Patent
Tsirkin et al.

(10) Patent No.: US 11,151,051 B2
(45) Date of Patent: *Oct. 19, 2021

(54) PROCESS ISOLATION FOR OUT OF PROCESS PAGE FAULT HANDLING

(71) Applicant: Red Hat, Inc., Raleigh, NC (US)

(72) Inventors: Michael Tsirkin, Lexington, MA (US); Andrea Arcangeli, Milan (IT); David Alan Gilbert, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,917

(22) Filed: Oct. 7, 2019

(65) Prior Publication Data

US 2020/0042461 A1 Feb. 6, 2020

Related U.S. Application Data

(63) Continuation of application No. 15/840,507, filed on Dec. 13, 2017, now Pat. No. 10,437,735.

(51) Int. Cl.
*G06F 12/1009* (2016.01)
*G06F 9/455* (2018.01)

(52) U.S. Cl.
CPC ...... *G06F 12/1009* (2013.01); *G06F 9/45558* (2013.01); *G06F 2212/655* (2013.01); *G06F 2212/657* (2013.01)

(58) Field of Classification Search
CPC ............ G06F 12/1009; G06F 9/45558; G06F 2212/655; G06F 2212/657; G06F 2212/65; G06F 2212/651
See application file for complete search history.

(56) References Cited

U.S. PATENT DOCUMENTS 4,742,447 A * 5/1988 Duvall ................ G06F 12/0882
718/1
5,729,710 A 3/1998 Magee et al.
(Continued)

FOREIGN PATENT DOCUMENTS

EP 3121731 A1 1/2017

OTHER PUBLICATIONS

Eranian, Stephane & Mosberger, David, "Virtual Memory in the IA-64 Linux Kernel", Nov. 8, 2002, Senior Research Scientist at HP Labs, http://www.informit.com/articles/article.aspx?p=29961&seqNum=5, 11 pages.
Carbel, Jonathan, Page Faults in User Space: MADV_USERFAULT, remap_anon_range(), and user faultfd(), Oct. 7, 2014, https://lwn.net/Articles615086/, 5 pages.
USPTO, Notice of Allowance for U.S. Appl. No. 15/840,507, dated May 31, 2019.
(Continued)

*Primary Examiner* — William E. Baughman
*Assistant Examiner* — Janice M. Girouard
(74) *Attorney, Agent, or Firm* — Lowenstein Sandler LLP

(57) ABSTRACT

A system and method relates to detecting a hardware event, determining a first virtual memory address associated with the hardware event, wherein the first virtual memory address is associated with a first processing thread, identifying, using the first virtual memory address, an entry of a logical address table, the entry comprising a file descriptor and a file offset associated with a file, identifying a memory address table associated with the file descriptor, translating, using the memory address table, the file offset into a second virtual memory address associated with a second processing thread, and transmitting, to the second processing thread, a notification comprising the second virtual memory address.

20 Claims, 6 Drawing Sheets

(56) References Cited

U.S. PATENT DOCUMENTS

| | | |
|---|---|---|
| 7,047,520 B2 | 5/2006 | Moore et al. |
| 7,500,074 B2 | 3/2009 | Cholleti et al. |
| 8,341,627 B2 | 12/2012 | Mohinder |
| 9,069,658 B2 | 6/2015 | Borchers |
| 9,229,881 B2 | 1/2016 | Epstein |
| 9,424,114 B2 | 8/2016 | Horman |
| 9,514,285 B2 | 12/2016 | Durham et al. |
| 2004/0160446 A1 | 8/2004 | Gosalia et al. |
| 2015/0106572 A1 | 4/2015 | Stone et al. |
| 2015/0212956 A1 | 7/2015 | Tsirkin et al. |
| 2016/0378677 A1 | 12/2016 | Castelino et al. |
| 2017/0010978 A1 | 1/2017 | Stabrawa et al. |
| 2017/0123997 A1 | 5/2017 | Aslot et al. |
| 2017/0168952 A1 | 6/2017 | Zhu et al. |

OTHER PUBLICATIONS

Tuulos, Ville, "Querying Data in Amazon S3 Directly with User-Space Page Fault Handling", Head of Data at AdRoll, http:l/tech.adroll.com/blog/data/2016/11/29/traildb-mmap-s3.html, Nov. 29, 2016, 13 pages.

Kashyap, Sanidhya et al., "Instant OS Updates via Userspace Checkpoint-and-Restart", Georgia Institute of Technology; CRIU and Odin, Inc., https://sslab.gtisc.gatech.edu/assets/papers/2016/kashyap:kup.pdf, Jun. 22-24, 2016, 16 pages.

USPTO, Notice of Allowance for U.S. Appl. No. 15/689,341, dated May 15, 2019.

U.S. Appl. No. 15/689,341, "Security Enhanced out of Process User Space Handling of Hardware Events", filed Aug. 29, 2017.

* cited by examiner

Logical Address Table 150

| Virtual Memory Address 206 | File Descriptor 208 | File Offset 210 | |
|---|---|---|---|
| | | | ← 202 |
| | | | ← 204 |
| | | | |

FIG. 2A

Kernel 250

Memory Address Table Associated with Memory Monitor Processing Thread 220

FD1 →

| File Offset for FD1 222 | Virtual Address 224 |
|---|---|
| | |
| | |
| | |
| | |

PROCESS ISOLATION FOR OUT OF PROCESS PAGE FAULT HANDLING

RELATED APPLICATIONS

This application is a continuation of U.S. patent application Ser. No. 15/840,507 filed on Dec. 13, 2017, the entire content of which is incorporated by reference herein.

TECHNICAL FIELD

The present disclosure is generally related to data storage management, and more particularly, to the isolation of out-of-process page fault.

BACKGROUND

Modern computer systems include storage virtualization to enhance access to data stored on one or more data storage devices. A common example of storage virtualization is memory virtualization (e.g., virtual memory). Memory virtualization is a data storage technique that maps physical addresses of a memory device to virtual addresses for use by applications. Memory virtualization may hide storage fragmentation of an underlying memory device and may make it appear to user space applications that there is more physical memory available then is physically present on a computer system.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2A illustrates a logical address table according to an implementation of the present disclosure.

FIG. 2B illustrates a memory address table associated with a memory monitor processing thread according to an implementation of the present disclosure.

DETAILED DESCRIPTION

Figure 1:
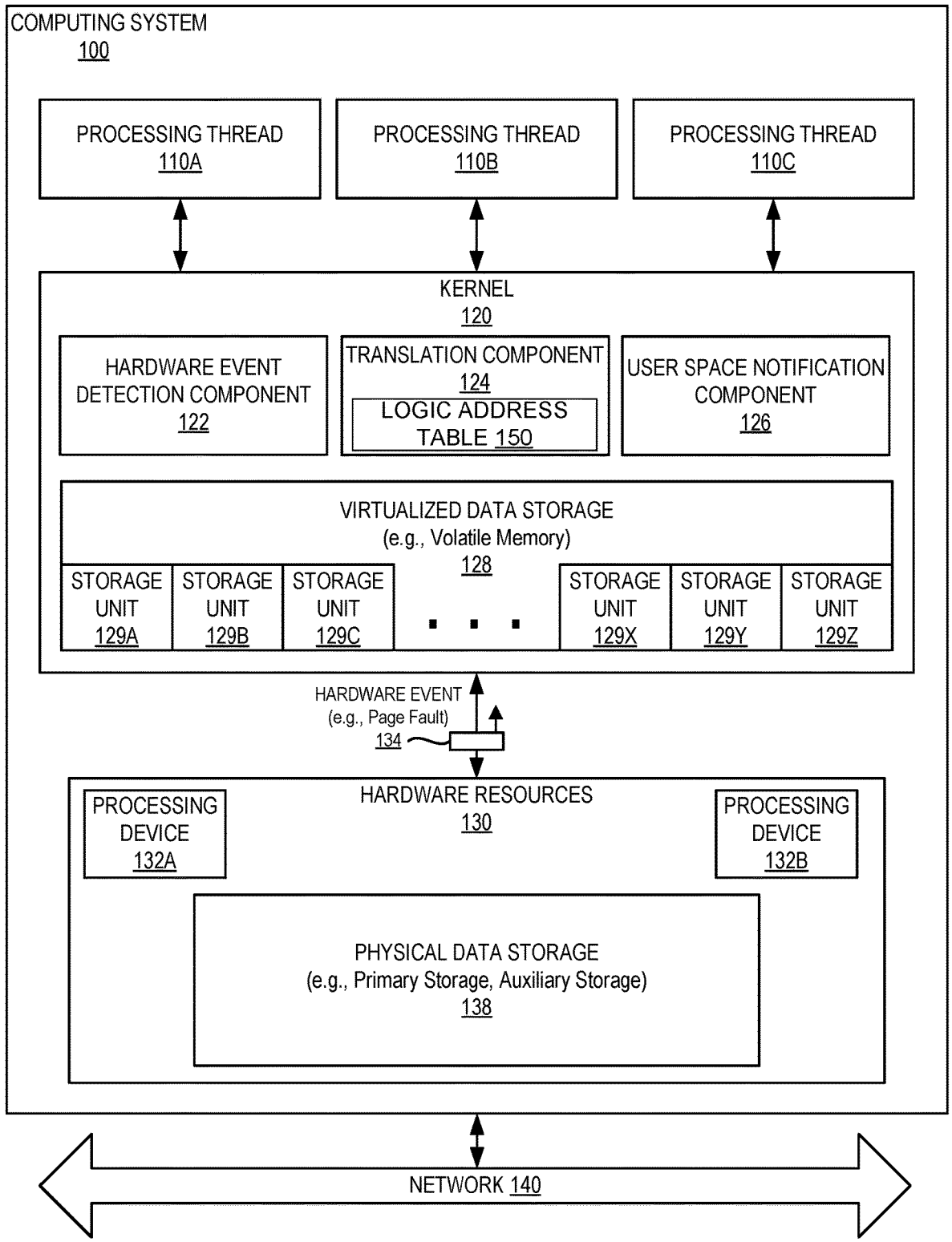
FIG. 1 depicts an illustrative a computing system according to an implementation of the present disclosure.

Computer systems may include memory virtualization features that contain security enhancements to reduce the computer systems' vulnerability to attack. An example of a security enhancement may involve altering the address space layout shared by processing threads. The alteration may include storing the executable code in one of multiple possible locations within the address space to reduce the chance of guessing the location of the executable code, thus reducing the ability of an attacker to compromise a processing thread because the executable code may no longer be at the original location within the address space. Other security enhancements may involve altering the virtual addresses shared across processing threads. For example, when a file (or other set of storage) is mapped into virtual memory, the kernel may need to choose a free range of virtual memory to map the file into. In some implementations, the kernel may always choose the lowest free address in the virtual memory address space. However, repeated executions (e.g., three times) of a program to access the same file may cause the file to be mapped to the same location in memory which exposes the memory location to the attacker. Adding a random factor (e.g., a random offset) to the choice of the mapping address may prevent the address from being known to an attacker.

An application may include one or more user space processing threads. Each user space processing thread may include a sequence of programmed instructions that can be managed by a scheduler of the operating system. Memory virtualization may be implemented by the kernel and may be hidden from a processing thread executing in the user space. The storage unit may include a storage data object (referred to as a file). The file may contain one or more data items. A data item may occupy a portion of the file, and the beginning of the data item may be located at a certain offset (e.g., measured in the number of bytes) from the beginning of the file. The byte offset is a measure of the number of bytes from the beginning of the file, and thus the byte offset is determined independent of the virtual address of the data item (referred to as the file offset of the data item).

For example, a user space processing thread may be assigned a range of virtual memory addresses that may appear to be accessible by the user processing thread although only a portion of the range may be loaded into the physical memory at a given point in time. When the user application requests to access a portion of virtual memory addresses that is not mapped to the physical memory, the computer hardware may generate a hardware event, e.g., a page fault. The kernel may detect and handle the page fault by retrieving the requested portion of virtual memory from a secondary storage device (e.g., swap space of a hard disk). The process of detecting the page faults and retrieving the data corresponding to the portion of the virtual memory may be handled by the kernel and is typically hidden from user space processing threads. In certain situations, it may be desirable to offload the task of handling page faults from the kernel to a user space memory monitor processing thread. The offloading may improve the performance of the kernel. Exposing the existence of page faults to other processing threads, however, may adversely affect the security enhancements to the memory virtualization. For example, the page fault handler may reference actual virtual addresses of the faulting processing thread. This may defeat any address randomization or masking techniques in place.

In some implementations, a memory monitor processing thread may monitor, working cooperatively with the kernel of an operating system, page faults generated by user processing threads. The memory monitor processing thread may be a thread in the user space and may serve to monitor page faults of multiple user processing threads. The kernel may detect a page fault at a virtual memory address associated with a user processing thread attempting to access a memory location storing a data item of a file. The data item may be located at a file offset (e.g., measured in terms of bytes) from the beginning of the file. The kernel may look up a logical address table to convert the virtual memory address to the file offset. The memory address table contains mappings between the virtual memory addresses and file offsets. The kernel may then notify the memory monitor thread of the file offset. Under these implementations, the memory monitoring process thread needs to have knowledge of the virtual memory address space of the faulting user processing thread. The exposure of the virtual memory space of the faulting thread to the memory monitor processing thread may allow the memory monitor processing thread to know the details of the virtual memory address space of the faulting thread. However, it is more desirable for the memory monitor processing thread to be ignorant of the virtual memory address space of the faulting thread.

In one implementation, the kernel may further convert the file offset into a second virtual memory address of the memory monitor processing thread. The kernel then notifies the memory monitor processing thread of the second virtual memory address. In this way, the monitor processing thread does not receive the virtual address information of the faulting processing thread. Thus, the memory monitor processing thread may monitor the virtual memory address space of the user processing thread without gaining knowledge of the virtual address space of the user processing thread. This may eliminate the security vulnerability created by sharing the virtual address information of the faulting processing thread with the memory monitoring processing thread. Instead, the file offset obtained from the logical address table (e.g., as shown in FIG. 2A) is then converted to another virtual address using the memory address table (e.g., as shown in FIG. 2B) and presented to the monitor processing thread.

The systems and methods described herein include technology that enhances the functionality and security of storage virtualization (e.g., memory virtualization). In particular, aspects of the present disclosure may allow a memory monitor processing thread to monitor page faults originated from actions of a user processing thread without gaining knowledge of the virtual address space of the user processing thread.

Various aspects of the above referenced methods and systems are described in details herein below by way of examples, rather than by way of limitation. The examples provided below discuss a virtualized computer system where the processing threads may be managed by aspects of a hypervisor, a host operating system, a virtual machine, or a combination thereof. In other examples, the processing thread may be performed in a computer system that is absent a hypervisor or other hardware virtualization features (e.g., virtual machines) discussed below.

FIG. 1 depicts an illustrative a computing system 100 according to an implementation of the present disclosure. Computing system 100 may include hardware resources 130, and a network 140. Hardware resources 130 may provide hardware functionality for performing computing tasks. Hardware resources 130 may include one or more processing devices 132A, 132B, one or more data storage devices, other computing devices, or a combination thereof. Hardware resources 130 may support an operating system including a kernel 120 and processing threads 110A-C. It should be noted that other architectures for computing system 100 are possible, and that the implementations of the computing system utilizing implementations of the disclosure are not necessarily limited to the specific architecture depicted.

Computing system 100 may be a single computing machine or multiple computing machines arranged in a homogenous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may execute one or more processing threads 110A-C and a kernel 120.

Each of the processing threads 110A-C may include a sequence of instructions executed by one or more processing devices 132A-132B. A processing thread may be managed by kernel 120 or may be a part of kernel 120. For example, kernel 120 may execute as one or more processing threads that cooperate to manage resource access by processing threads 110A-C. A process may include one or more threads and may be an instance of an executable computer program.

Processing threads 110A-C may be associated with a particular level of privilege and each of the processing threads 110A-C may have a similar level of privilege or they may have different levels of privilege. The privilege levels of a processing thread may be the same or similar to protection levels (e.g., processor protection rings) and may indicate an access level of a processing thread to computing resources (e.g., memory, processor, or other virtual or physical resources). There may be multiple different privilege levels assigned to the processing threads. In one example, the privilege levels may correspond generally to either a kernel privilege level or a user space privilege level. The user space privilege level may enable a processing thread to access resources assigned to the processing thread but may restrict access to resources assigned to another user space or kernel space processing thread. The kernel space privilege level may enable a processing thread to access resources assigned to other kernel space or user space processing threads.

Kernel 120 may manage processing threads 110A-C including controlling the access of hardware resources 130 based on the privilege levels. Kernel 120 can be a component of an operating system and may provide hardware virtualization, operating-system virtualization, other virtualization, or a combination thereof. Hardware virtualization may include the creation of one or more virtual machines that emulate a physical computing machine. Operating-system-level virtualization may involve the creation of one or more containers that emulate an instance of an operating system. In one example, kernel 120 may support a hypervisor and each of the processing threads 110A-C may execute within a separate virtual machine (or container). In another example, kernel 120 may be a part of a non-virtualized operating system that is absent hardware virtualization and operating-system-level virtualization and each of the processing threads 110A-C may be a user space process (e.g., application process) managed by the non-virtualized operating system. In either example, kernel 120 may provide storage virtualization in the form of virtualized data storage 128.

Virtualized data storage 128 may be a virtualization of physical data storage using virtualization technology that maps virtualized storage resources (e.g., storage units 129A-Z) to portions of physical data storage 138. Virtualized data storage 128 may be a layer of software abstraction provided by kernel 120 that hides the physical locations of data within physical data storage 138. Virtualized data storage 128 may enhance security due to memory isolation and may increase the perceived capacity of data storage resources. The capacity of storage units 129A-Z may exceed the capacity of the underlying physical data storage devices because virtualized data storage 128 may use a combination of multiple different storage devices (e.g., primary storage and auxiliary storage) to make it appear that the primary storage has more capacity than is physically present.

Storage units 129A-Z may be any virtualized unit of data storage for storing, organizing, or accessing data. A storage unit may include a contiguous or non-contiguous sequence of bytes or bits. A storage unit may be a logical representation of underlying physical storage units, which may be referred to as physical storage blocks. Storage units 129A-Z may have a unit size that is the same or different from a physical block size provided by underlying hardware. The block size may be a fixed-size, such as a particular integer value (e.g., 4 KB, 4 MB, 1 GB) or may be a variable-size that varies within any range of integer values. Each of the storage units 129A-Z may have the same block size or a different block size when compared to an adjacent storage unit. In one example, storage units 129A-Z may be a memory segment and each memory segment may correspond to an individual memory page, multiple memory pages, or a portion of a memory page. In other examples, each of the storage units 129A-Z may correspond to a portion (e.g., block, sector) of a mass storage device (e.g., hard disk).

Physical data storage 138 may include one or more physical storage devices that are capable of storing data. Physical data storage 128 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. Physical data storage 138 may include multiple different storage devices that are organized into layers to provide a caching mechanism. A first layer may be referred to as primary storage and a second layer may be referred to as auxiliary storage (e.g., secondary storage). In one example, the primary storage may include one or more memory devices that function as main memory and the auxiliary storage may include one or more hard disk drives (HDD), solid state drives (SSD), network resources (e.g., Storage Area Network (SAN), Network Attached Storage (NAS)), other local or remote data storage resources, or a combination thereof that may function as a backing store.

Virtualized data storage 128 may be addressed using physical addresses of a physical storage device which can be mapped to virtual memory addresses using the memory virtualization mechanism provided by kernel 120. Using the memory virtualization, the kernel may use a page table to map a memory page in the virtual address space associated with storage units 129 to segments of physical data storage 138, where the segment may correspond to an addressable portion of the physical data storage 138. The locations of storage units 129A-C may be provided to processing threads 110A-C using one or more virtual memory addresses of a virtual memory address space shared by multiple processing threads. Each of the storage units 129 may appear as a contiguous segment but may be mapped to non-contiguous segments of physical data storage 128.

Kernel 120 may provide virtualized data storage 128 using a combination of components. In the example shown in FIG. 1, kernel 120 may be associated with a hardware event component 122 (e.g., software component implemented on a hardware circuit such as, for example, a memory management unit (MMU)), a translation component 124, and a user space notification component 126.

Hardware event component 122 of kernel 120 may detect (e.g., by the MMU) a hardware event 134 originating from hardware resources 130. A hardware event 134 can be a fault (e.g., a page fault), an exception, an interrupt, a signal, or a combination thereof initiated by hardware resources 130. Hardware event 134 may occur in response to an action of a processing thread, and the hardware event may cause the kernel to halt the execution of the processing thread. In one example, hardware event 134 may be the same or similar to a page fault that is initiated by a Memory Management Unit (MMU) coupled to a processing device. The page fault may indicate that a processing thread attempted to access a storage unit (e.g., memory page) that is available in virtualized data storage 128 but is not available in the underlying physical data storage (e.g., main memory) and need to be swapped into the physical data storage from an auxiliary storage device.

Hardware event component 122 may enable one processing thread (also referred to as a memory monitor processing thread) to register as a listener for hardware events associated with other processing threads. A thread may make a system call to the kernel to register as a listener for a storage region accessed by other threads. This may enable the memory monitor processing thread to handle a hardware event 134 that is generated by another processing thread. The memory monitor processing thread may work cooperatively with kernel 120 to handle hardware events for other processing threads. For example, the kernel may notify the memory monitor processing thread a second virtual memory address associated with the memory monitor processing thread. The memory monitor processing thread may swap data into the memory in view of the second virtual memory address. In one implementation, hardware event detection component 122 may register one of the processing threads to listen to events encountered by one of the other processing threads and to handle the hardware events. In one example, the hardware event may be a page fault caused by the first processing thread (110A), and the second processing thread may handle the page fault by retrieving the data (that need to be swapped into the memory) from auxiliary storage (e.g., backing store). Hardware event detection component 122 may detect (e.g., by detecting a hardware interrupt signal) that the page fault is generated by the first processing thread attempting to access a data item stored at a storage unit identified by a first virtual memory address. Component 122 may use the logical address table to determine the first virtual memory address.

A processing thread (e.g., 110A) may attempt to access the data item using the first virtual memory address. The first virtual memory address may belong to a virtual memory page. If the virtual page is mapped by a page table (a data structure containing the mappings between virtual addresses and physical addresses) to a physical location of the physical data storage 138, where the physical data storage 138 may require swapping data from an auxiliary storage device, the memory management unit may generate a hardware event (i.e., a page fault) and load the data item from an auxiliary storage to the physical storage. The kernel 120 may need to notify the memory monitoring processing thread (e.g., 110C) of the location of the page fault without exposing the virtual memory address of the faulting processing thread (110A) or the file offset. In this implementation, the kernel may notify the memory monitoring processing thread of a second virtual memory address associated with the memory monitor processing thread. In this way, the memory monitor processing thread may swap data into the location without knowing the virtual memory address associated with the faulting thread or the file offset.

In one implementation, the processing device may execute translation component 124 of kernel 120 to translate the first virtual memory address associated with the faulting processing thread to a second virtual memory associated with the memory monitoring processing thread. Both the first virtual memory address and the second virtual memory address are specified in the virtual memory address space shared by multiple processing threads (110A-110C) including both the faulting processing thread and the memory monitor processing thread, where the faulting thread and the memory monitor processing thread may share all or some of physical memory region through different virtual memory address mappings.

In one implementation, translation component 124 may include a logical address table 150 to facilitate the translation between the first virtual memory address and the second virtual memory address. Logical address table 150 may include entries indexed according to the virtual memory addresses associated with the user processing thread. FIG. 2A illustrates a logical address table 150 according to an implementation of the present disclosure. As shown in FIG. 2A, logical address table may include entries 202, 204. Each entry 202, 204 indexed by a virtual address 206 may include a first field 208 to store a file descriptor and a second field 210 to store a file offset, where the file descriptor is a unique identifier for a file, and the file offset is the byte offset of the first virtual memory address from the beginning of the file.

A portion of the file may be loaded into the memory while the rest of the file may be stored in a swap space in the auxiliary storage device. For example, the processing device may read, write, and close the file by referring to the file descriptor. The kernel may index the file descriptor in a per-process file descriptor table which may be mapped into a file table containing files by all processes.

Responsive to detecting a page fault generated by the user processing thread attempting to access a virtual memory address, translation component 124 may look up the logical address table 150 to identify an entry associated with the virtual memory address, where the entry may contain a file descriptor and a file offset. In one implementation, the processing device may execute translation component 124 to perform a further address translation to covert the file offset to a second virtual memory address to be supplied to the memory monitor thread.

Translation component 124 may identify a memory address table associated with the memory monitor processing thread. The memory address table is a data structure maintained by the kernel, containing the mappings from a file offset associated with a file identified by a file descriptor to a virtual address associated with the memory monitor processing thread.

FIG. 2B illustrates a memory address table 220 associated with a memory monitor processing thread according to an implementation of the present disclosure. A kernel 250 may include memory address table 220 that is associated with the memory monitor processing thread. The memory address table may include the mappings from the file offsets of different files (identified by file descriptors FD1, FD2 etc.) to the virtual addresses of the memory monitor processing thread. For example, memory mapping table 220 may include mappings from a file offset 222 of a file identified by FD1 to a virtual memory address 224 of the memory monitor processing thread. Translation component 124 may convert the file offset retrieved from the logical address table 150 to the second virtual memory address associated with the memory monitor processing thread.

User space notification component 126 may enable kernel 120 to notify one or more processing threads that hardware event 134 have been detected. User space notification component 126 may enable kernel 120 to determine whether any processing threads are registered to listen to hardware event 134. The determination may be based on a registration table of the kernel, where the registration table may keep a record of the current memory monitor processing thread. For example, user space notification component 126 may determine that the memory monitor processing thread is listening to the hardware events, and notify the memory monitor processing thread of a virtual memory address in the virtual address space of the memory monitor processing thread, where the virtual memory address may be determined by the kernel using a memory address table 250. Thus, user space notification component 126 may notify the memory monitor processing thread of the hardware event (e.g., page fault) without exposing virtual memory addresses of the faulting processing thread or the file offset.

Implementations of the present disclosure may further include handling the detected hardware event (page fault). In one implementation, responsive to receiving the notification including the second virtual memory address, the memory monitor processing thread may request the kernel 120 to retrieve the data item from the auxiliary data storage associated with another host and store the data in the physical storage corresponding to the storage unit, thus swapping the data item into the memory from the auxiliary data storage.

In one implementation, there may be an idle processes waiting for the data item to be swapped into the memory at the memory page, where the idle process may have previously been halted by the kernel due to the absence of the data item in the memory. Kernel 120 may use a reverse mapping table (RMAP—from page to virtual memory addresses) to identify these idle processes waiting for the page and wake up these idle processes to allow them to access the memory page, where the RMAP may include mappings from file descriptor and offsets to process identifiers.

One or more of hardware resources 130 may be split up into multiple separate devices or consolidated into one or more hardware devices. Some of the hardware device shown may be absent from hardware resources 130 and may instead be partially or completely emulated by executable code.

Processing devices 132A and 132B may include one or more processors that are capable of executing the computing tasks discussed above in regards to components 122, 124 and 126. Processing devices 132A and 132B may be a single core processor that is capable of executing one instruction at a time (e.g., single pipeline of instructions) or may be a multi-core processor that simultaneously executes multiple instructions.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 3:
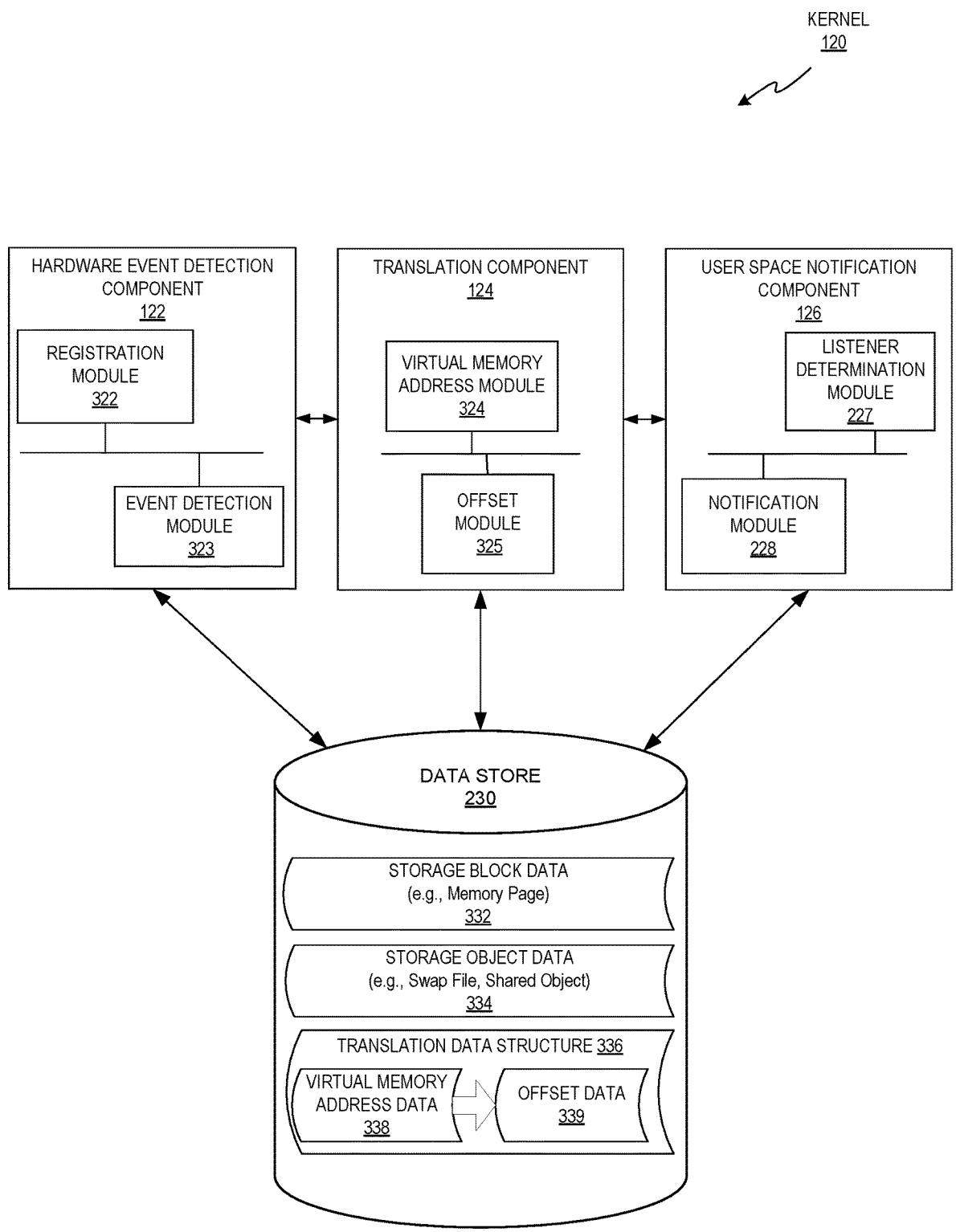
FIG. 3 is a block diagram illustrating example components and modules of kernel, in accordance with one or more aspects of the present disclosure.

FIG. 3 is a block diagram illustrating example components and modules of kernel 120, in accordance with one or more aspects of the present disclosure. In the example shown, kernel 120 may include a hardware event component 122, a translation component 124, a user space notification component 126, and a data store 330. More or less components or modules may be included without loss of generality. For example, two or more of the components may be combined into a single component, or features of a component may be divided into two or more components. In one implementation, one or more of the components may reside on different computing devices (e.g., a client device and a server device).

Hardware event component 122 may include executable code that enables kernel 120 to interact with underlying hardware resources. Hardware event component 122 may include a registration module 322 and an event detection module 323.

Registration module 322 may enable a processing thread to listen to hardware events of another processing thread. The processing threads may both be user space processing threads and a first processing thread (referred to as a memory monitor processing thread) may use registration module 322 to register with kernel 120 to listen to hardware events that occur during the execution of a second processing thread. A thread may make a system call to the kernel to register as a listener for a storage region accessed by other threads. When a page fault occurs for the storage region, the kernel may place the faulting thread to sleep, and the memory management unit may generate a hardware event. The memory monitor processing thread may discover the hardware event using event detection module 323 (e.g., by event detection module 232 monitoring page fault interrupt signals). Using the memory monitor processing thread to handle hardware events may move the task of handling page faults from the kernel to the user-space memory monitor processing thread, thus reducing the burden on the kernel.

Event detection module 323 may detect (e.g., by monitoring interrupt signals) the occurrence of hardware events for a registered region of storage (e.g., range of storage units). Detecting the hardware event may involve detecting a fault, an exception, an interrupt, other signal, or a combination thereof that is initiated by a hardware device. The hardware event may correspond to a particular storage unit and may identify (e.g., by looking up a memory address table associated with the processing thread causing the hardware event) the storage unit. In one example, the hardware event may be a page fault of a first processing thread that is handled by a second processing thread. The page fault may be encountered in response to the first processing thread attempting to access a storage unit in a virtual memory address space (e.g., virtual memory) that does not currently reside in physical memory.

Translation component 124 may translate (e.g., by using the logical address table 150) the virtual memory address to an offset that is independent of the virtual memory address space and then translate (e.g., by using the memory address table 250) the offset to a second virtual memory address of the memory monitor processing thread. Exposing which virtual memory addresses correspond to which processing threads may adversely affect existing security enhancement techniques, such as address space layout randomization (ASLR). ASLR may be a security technique that reduces exploitation of memory vulnerabilities by reducing an attacker's ability to reliably jump to a particular function in memory. ASLR may randomly arrange (e.g., by increasing the number of possible address space locations and placing the address space in a random one of many possible locations) the address space positions of a processing thread's key data areas, such as the starting locations of the executable, stack, heap, libraries, or other portions of the processing thread. In the example shown in FIG. 3, translation component 124 may avoid exposing the virtual memory addresses by using a virtual memory address module 324 and an offset module 325.

Virtual memory address module 324 may interface with the virtual memory address space that is shared across multiple processing threads. Virtual memory address module 324 may analyze the hardware event, which may include information indicating the virtual address that corresponds to the hardware event. The information may include the one or more virtual addresses or other information that may be used to determine a virtual address.

Offset module 325 may determine the file offset corresponding to the virtual address using information (e.g., identifier of the storage object) contained in storage object data 334. For example, storage object data 334 may include identifier of the storage object that functions as a backing store for the virtualized data storage. The storage object may be a file, a shared kernel object, other object, or a combination thereof that stores data of a storage unit. The storage object may be referenced through a file descriptor and may exist on auxiliary storage and function to extend the capacity of the primary storage. The offset may be a displacement value relative to the storage object and may identify a location within the storage object that corresponds to the virtual memory address. The file offset may be used as a substitute for the virtual memory address and may be specific to the processing thread that encountered the hardware event or the processing thread that is listening for the hardware event. In one implementation, the offset module may determine the file offset by counting the number of byte from the location corresponding to the virtual address to the beginning of the file. Translation data structure 336 may map particular virtual memory addresses (e.g., virtual addresses) to particular offsets of the storage object.

In one example, a storage unit can be a memory-mapped file. A memory-mapped file may be a segment of virtual memory (e.g., storage unit) that has been assigned a direct byte-for-byte correlation with a portion of a storage object. The storage object may be a file object that is physically present in the auxiliary storage (e.g., present on disk) or it may be a shared memory object, device (e.g., local or remote device), other resource, or a combination thereof that kernel 120 may reference through a file descriptor.

User space notification component 126 may enable kernel 120 to notify one or more processing threads that a hardware event has been detected. User space notification component 126 may include a listener determination module 327 and a notification module 328. The listener determination module 327 may enable the kernel to determine (e.g., by looking up a registration table of the kernel) whether any processing threads (e.g., user space processes or guest operating system processes) have registered as a listener for a particular region of storage units. If there are registered processing threads, listener determination module 327 may provide identification information for the listening processing threads. The identification information may include any identification information for a processing thread (e.g., process identifier (PID)). Notification module 328 may then enable kernel 120 to transmit a notification of the hardware event to the registered processing thread. In one example, the notification may include the offset and the file descriptor of the storage object. In another example, the notification may include the offset without providing any information about the storage object.

Figure 4:
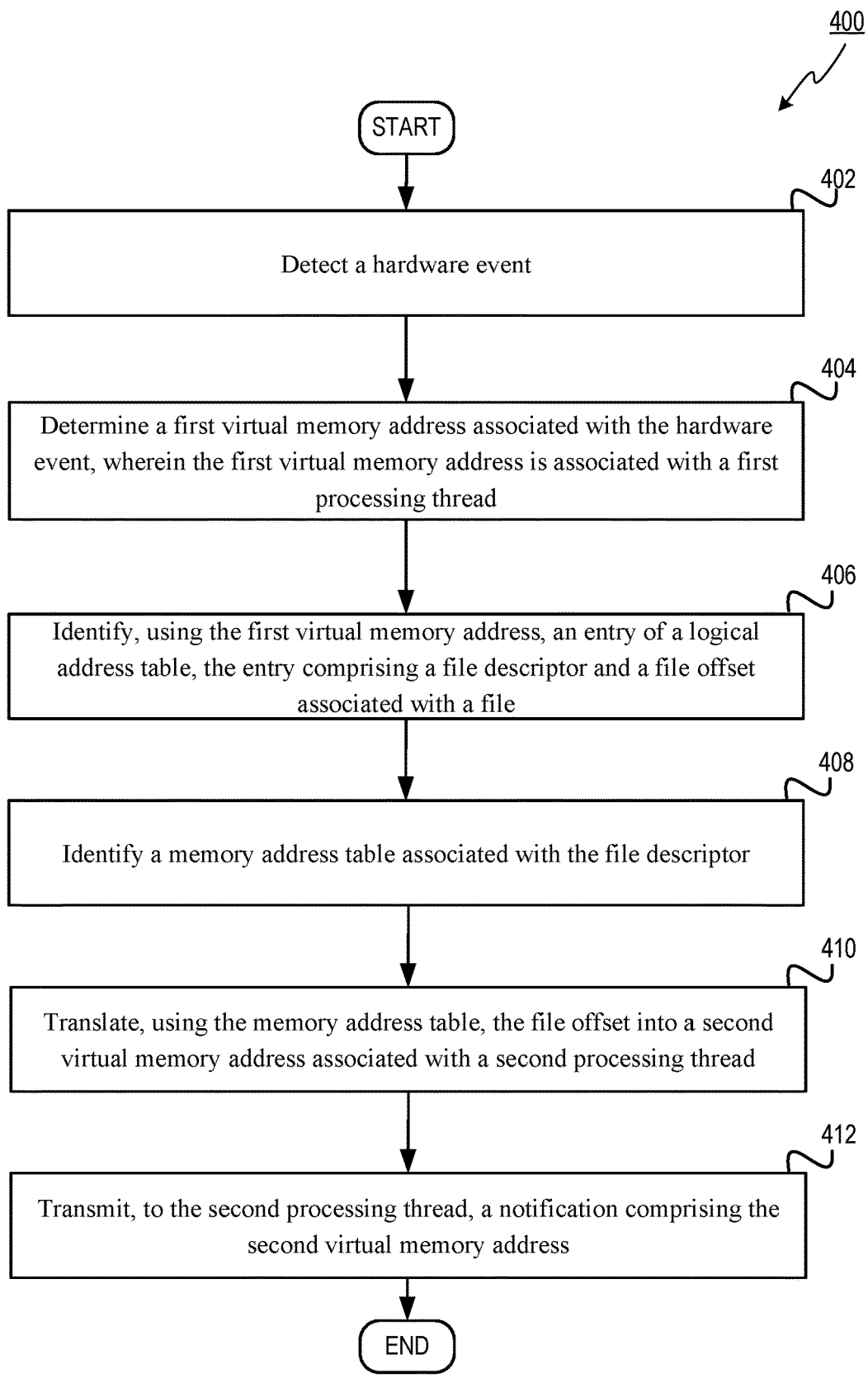
FIG. 4 depicts a flow diagram of an illustrative example of a method for handling hardware events (e.g., page faults) across processing threads, in accordance with one or more aspects of the present disclosure.

FIG. 4 depicts a flow diagram of an illustrative example of a method 300 for handling hardware events (e.g., page faults) across processing threads, in accordance with one or more aspects of the present disclosure. Method 300 and each of its individual functions, routines, subroutines, or operations may be performed by one or more processors of the computer device executing the method. In certain implementations, method 300 may be performed by a single processing thread of a kernel. Alternatively, methods 300 may be performed by two or more processing threads, each thread executing one or more individual functions, routines, subroutines, or operations of the method. In an illustrative example, the processing threads implementing methods 400 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by kernel 120 of FIGS. 1 and 3.

Method 400 may be performed by processing devices of a server device or a client device. At block 402, a processing device executing a kernel may detect a hardware event.

At 404, the processing device may determine a first virtual memory address associated with the hardware event, wherein the first virtual memory address is associated with a first processing thread.

At 406, the processing device may execute the kernel to identify, using the first virtual memory address, an entry of a logical address table, the entry comprising a file descriptor and a file offset associated with a file. The logical address table may be accessible by the kernel. In one implementation, the kernel may have exclusive access to the logical address table.

At 408, the processing device may execute the kernel to identify a memory address table associated with the file descriptor, where the memory address table may contain mappings between file offsets and virtual memory addresses associated with another user-space processing thread.

At 410, the processing device may execute a translation component of the kernel to translate, using the memory address table, the file offset into a second virtual memory address associated with a second processing thread. The memory address table may contain the mappings between file offsets and the virtual memory address of the second processing thread. In one implementation, the second processing thread may have been registered with the kernel to monitor hardware events generated by the first processing thread (or any other user-space processing threads).

At 412, the processing device may execute the kernel to transmit, to the second processing thread, a notification comprising the second virtual memory address. In this way, the second processing thread may receive information about the hardware event in terms of the virtual memory addresses mapped to the second processing thread.

In one example, the first processing thread and the second processing thread may be executed by separate virtual machines that are managed by the same kernel (e.g., hypervisor, host operating system). In another example, the first processing thread and the second processing thread may be separate user space processes managed by the same kernel (e.g., operating system absent hardware virtualization). The processing thread may be either a computer based process or a computer based thread. In another example, the first processing thread may comprise a user space thread and the second processing thread may comprise a kernel thread. The user space thread and the kernel thread may be threads executing with user space privileges and kernel space privileges respectively.

Figure 5:
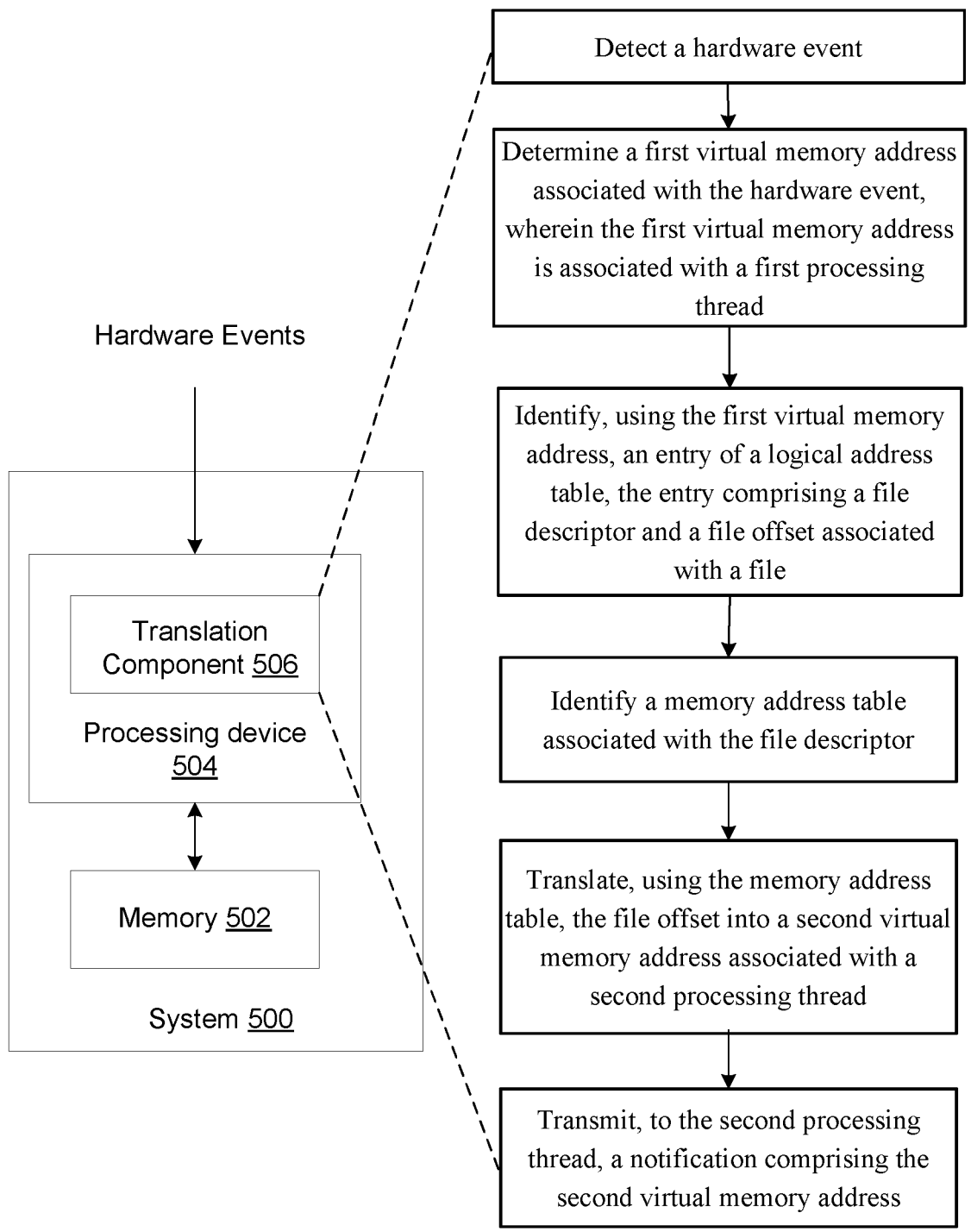
FIG. 5 is a system for handling a hardware event (e.g., a page fault) according to an implementation of the present disclosure.
Figure 6:
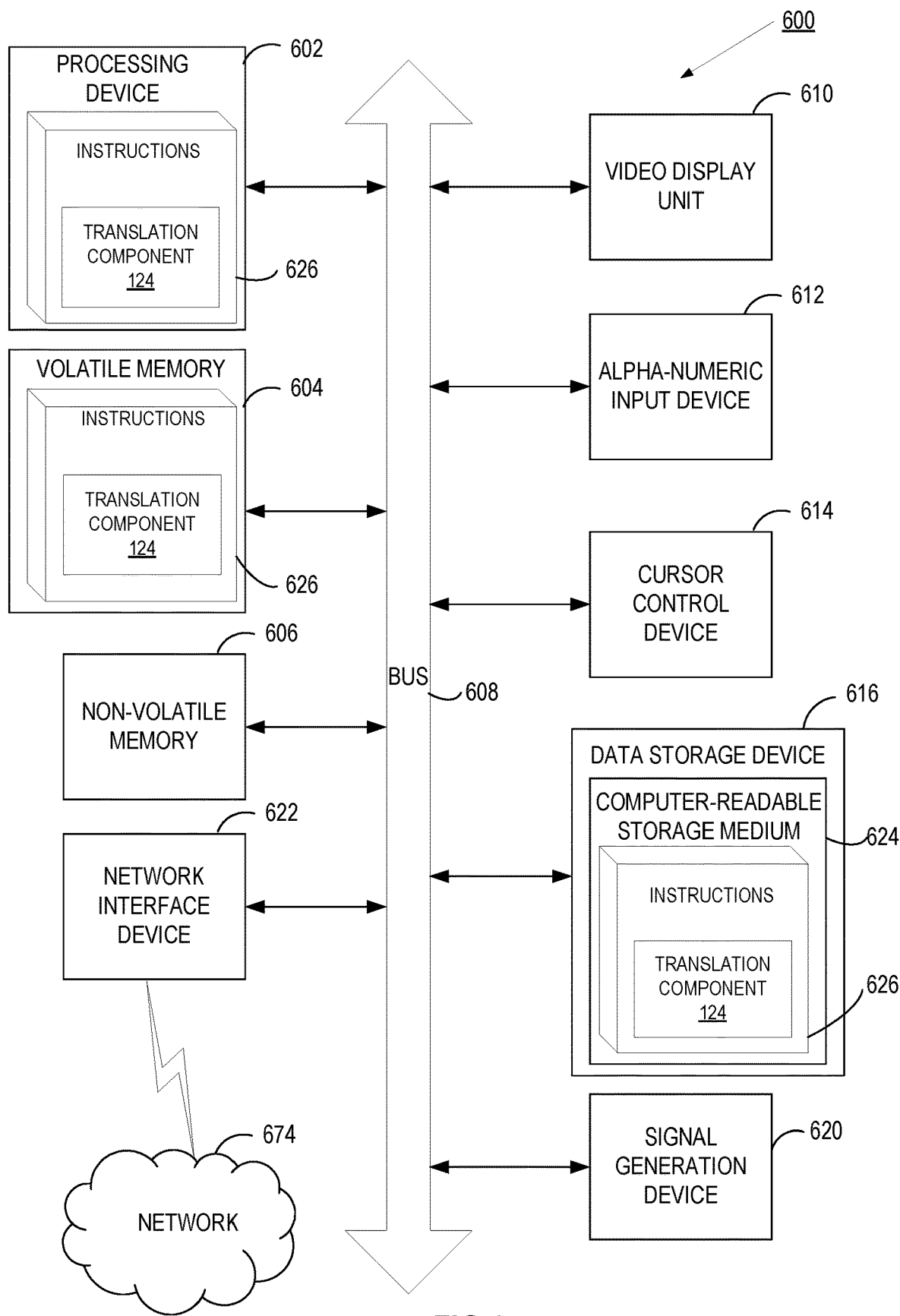
FIG. 6 depicts a block diagram of an illustrative computing device operating in accordance with the examples of the present disclosure.

FIG. 5 is a system 500 for handling a hardware event (e.g., a page fault) according to an implementation of the present disclosure. System 500 may include a memory 502 and a processing device 504 communicatively coupled to memory 502. The processing device 504 may execute a translation component 506 of a kernel to detect, by a kernel, a hardware event corresponding to a first virtual memory address associated with a first processing thread, identify, using the first virtual memory address, an entry of a logical address table, the entry comprising a file descriptor and a file offset associated with a file, identify a memory address table associated with the file descriptor, translate, using the memory address table, the file offset into a second virtual memory address associated with a second processing thread, and transmit, to the second processing thread, a notification comprising the second virtual memory address.

FIG. 5 depicts a block diagram of a computer system operating in accordance with one or more aspects of the present disclosure. In various illustrative examples, computer system 500 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 500 and for encoding translation component 124 of FIGS. 1 and 3.

Instructions 526 may also reside, completely or partially, within volatile memory 504 and/or within processing device 502 during execution thereof by computer system 500, hence, volatile memory 504, and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    determining, by a processing device, a first virtual memory address associated with a first processing thread;
    identifying, using the first virtual memory address, a file descriptor and a file offset associated with a file;
    translating the file offset into a second virtual memory address associated with a second processing thread; and
    transmitting, to the second processing thread, a notification comprising the second virtual memory address.

2. The method of claim 1, further comprising:
    registering, with a kernel, the second processing thread to receive notifications of hardware events generated by the first processing thread.

3. The method of claim 1, wherein the first processing thread is associated with a first virtual machine and the second processing thread is associated with a second virtual machine.

4. The method of claim 1, wherein the file comprises a memory-mapped file object of one of a non-volatile file system or a volatile file system.

5. The method of claim 1, further comprising:
    responsive to receiving a request from the second processing thread, retrieving data from an auxiliary storage and populating the data at the first virtual memory address.

6. The method of claim 1, further comprising:
    identifying a third processing thread associated with the first virtual memory address; and
    waking up the third processing thread.

7. The method of claim 1, wherein the file provides auxiliary storage for a virtual memory associated with the first processing thread.

8. A system comprising:
a memory;
a processing device executing a kernel and operatively coupled to the memory, the processing device to:
   determine a first virtual memory address associated with a first processing thread;
   identify, using the first virtual memory address, a file descriptor and a file offset associated with a file;
   translate the file offset into a second virtual memory address associated with a second processing thread; and
   transmit, to the second processing thread, a notification comprising the second virtual memory address.

9. The system of claim 8, wherein the processing device is further to:
   register, with a kernel, the second processing thread to receive notifications of hardware events generated by the first processing thread.

10. The system of claim 8, wherein the first processing thread is associated with a first virtual machine and the second processing thread is associated with a second virtual machine.

11. The system of claim 8, wherein the file comprises a memory-mapped file object of one of a non-volatile file system or a volatile file system.

12. The system of claim 8, wherein the processing device is further to:
   responsive to receiving a request from the second processing thread, retrieve data from an auxiliary storage and populating the data at the first virtual memory address.

13. The system of claim 8, wherein the processing device is further to:
   identify a third processing thread associated with the first virtual memory address; and
   wake up the third processing thread.

14. The system of claim 8, wherein the file provides auxiliary storage for a virtual memory associated with the first processing thread.

15. A non-transitory machine-readable storage medium comprising executable instructions that, when executed by a processing device, cause the processing device to:
   determine a first virtual memory address associated with a first processing thread;
   identify, using the first virtual memory address, a file descriptor and a file offset associated with a file;
   translate the file offset into a second virtual memory address associated with a second processing thread; and
   transmit, to the second processing thread, a notification comprising the second virtual memory address.

16. The non-transitory machine-readable storage medium of claim 15, further comprising executable instructions that, when executed by the processing device, cause the processing device to:
   register, with a kernel, the second processing thread to receive notifications of hardware events generated by the first processing thread.

17. The non-transitory machine-readable storage medium of claim 15, wherein the first processing thread is associated with a first virtual machine and the second processing thread is associated with a second virtual machine.

18. The non-transitory machine-readable storage medium of claim 15, wherein the file comprises a memory-mapped file object of one of a non-volatile file system or a volatile file system.

19. The non-transitory machine-readable storage medium of claim 15, further comprising executable instructions that, when executed by the processing device, cause the processing device to:
   responsive to receiving a request from the second processing thread, retrieve data from an auxiliary storage and populating the data at the first virtual memory address.

20. The non-transitory machine-readable storage medium of claim 15, further comprising executable instructions that, when executed by the processing device, cause the processing device to:
   identify a third processing thread associated with the first virtual memory address; and
   wake up the third processing thread.

* * * * *